Sept. 13, 1932.  F. W. BOMMER ET AL  1,876,600
APPARATUS FOR FORMING RUBBER THREADS OR STRIPS
Filed Nov. 2, 1929  2 Sheets-Sheet 1
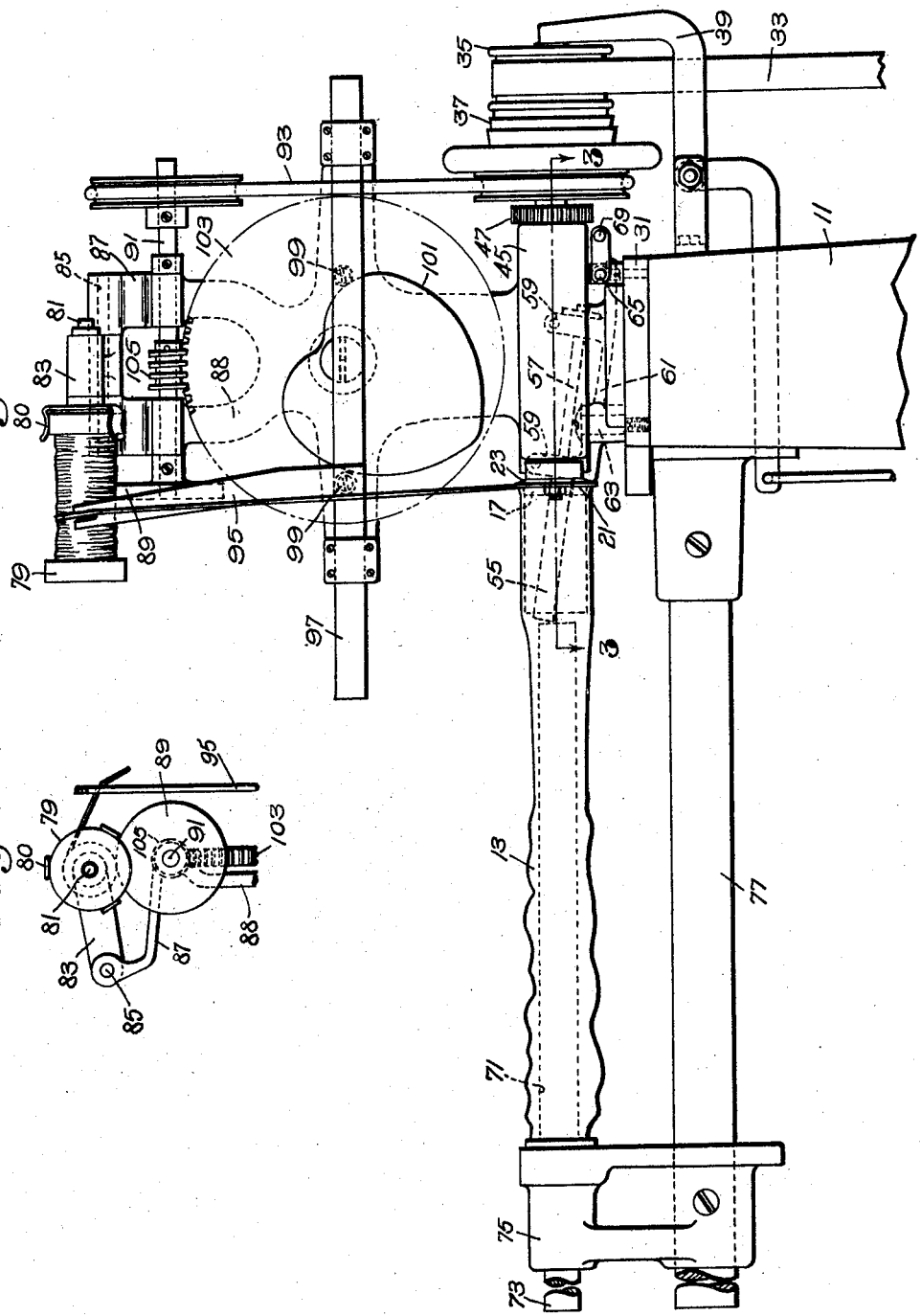
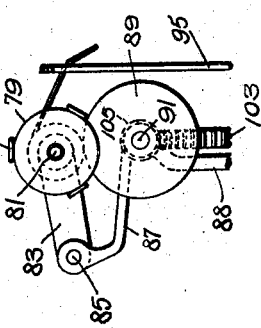
Inventors:
Fred W. Bommer,
Charles E. Clarke,
by Emery Booth Varney Townsend Attys

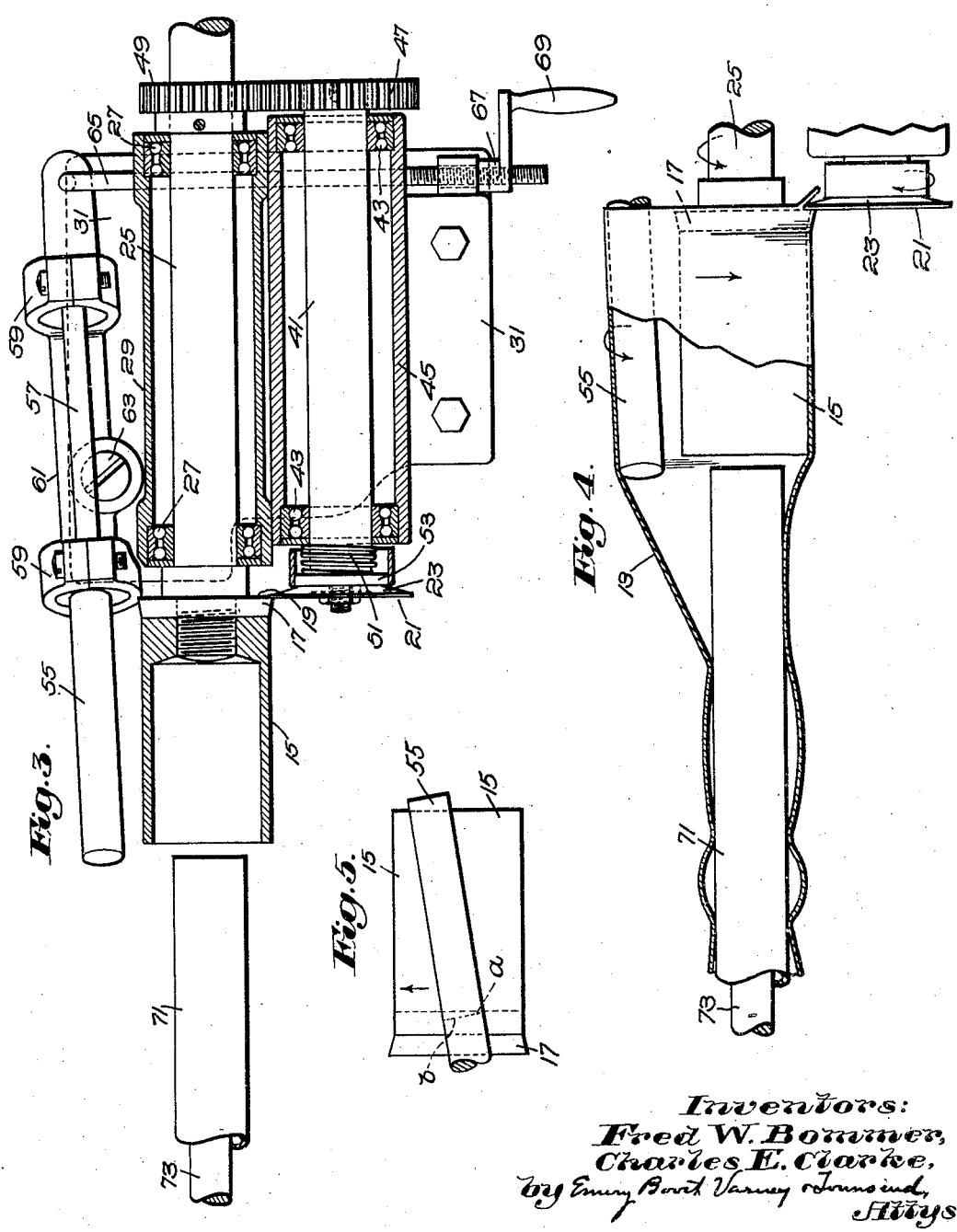

Patented Sept. 13, 1932

1,876,600

UNITED STATES PATENT OFFICE

FRED WILLIAM BOMMER AND CHARLES E. CLARKE, OF WINCHESTER, MASSACHUSETTS, ASSIGNORS, BY MESNE ASSIGNMENTS, TO STOWE-WOODWARD, INC., OF NEWTON, MASSACHUSETTS

APPARATUS FOR FORMING RUBBER THREADS OR STRIPS

Application filed November 2, 1929. Serial No. 404,446.

This invention relates to apparatus for forming narrow strips or threads of rubber or like elastic material by cutting the same from a body of generally tubular formation, and has for its object the cutting of such strips or threads in a simple manner but with increased rapidity and precision.

The invention will be best understood by reference to the following description when taken in connection with the accompanying illustration showing one specific embodiment thereof, while its scope will be more particularly pointed out in the appended claims.

In the drawings:

Fig. 1 is a front elevation of the principal working parts of an apparatus embodying one form of the invention;

Fig. 2 is a detail showing in end view the winding reel mechanism.

Fig. 3 is a sectional plan view on an enlarged scale taken on the line 3—3 in Fig. 1;

Fig. 4 is a plan view in outline illustrating the cutting and feeding action; and Fig. 5 is a rear elevation in outline of the mandrel and roller showing in an elevational aspect the angular position of the latter with relation to the former.

Referring to the drawings and to the embodiment of the invention there shown for illustrative purposes, the principal working parts of the machine are carried by the standard 11, the latter supported on a base not shown. The machine is designed to cut a continuous helical thread or strip from a body of tubular rubber stock, such as the tube 13 (Figs. 1 and 4). The leading end of the tubular body, or that end which is to be progressively cut, is stretched over a rotary mandrel 15 (Figs. 3 and 4), so that the latter has frictional engagement with the inner walls of the tube. The mandrel carries a hardened shearing member 17 which is in the form of a sleeve secured to the leading end of the mandrel, the sleeves preferably having a periphery slightly flared or beveled outwardly toward its edge and presenting a shearing edge 19 adapted to underlie the end of the tubular body and to be maintained in contact with the shearing edge 21 of a rotary cutting knife 23.

The mandrel 15, which is preferably of a diameter somewhat greater than the inside diameter of the tubular body when the latter is not stretched or distended, is mounted on the drive shaft 25 (Fig. 3) journaled in bearings 27 supported in the barrel-shaped casing 29, the latter being carried by the head block 31. Rotary movement is imparted to the drive shaft 25 from any suitable source of power, such as the driving belt 33 (Fig. 1) engaging the pulley 35 mounted on the end of the drive shaft 25, there being also provided a friction clutch 37 actuated through the lever 39 operated from a foot treadle (not shown) whereby the operator may apply power at will to start or stop the rotation of the mandrel.

The rotary cutting knife 23 is rigidly secured on the end of the knife shaft 41 (Fig. 3) journaled in bearings 43 supported in the barrel-shaped casing 45 also carried by the head block 31. To drive the rotary cutter, the opposite end of the cutter shaft 41 has secured thereto the gear 47 which meshes with a gear 49 on the mandrel drive shaft 25.

To maintain a close contact between the shearing edge of the mandrel and the shearing edge of the knife, resilient means are herein employed for forcing the two into engagement, such means being in the form of a spiral spring 51 (Fig. 3), one end of which seats against the shouldered head 53 secured to the knife and to the shaft 41, and the opposite end of which abuts against a fixed part of the bearing 43. The shaft 41 is allowed a limited but free sliding movement lengthwise within its bearings, so that the spring 51 tends to force the shaft and the knife together as a unit toward the mandrel 15, maintaining an efficient shearing engagement between the two edges as the mandrel and knife are rapidly rotated.

In the operation of the machine, the mandrel and knife are rotated in the direction shown by the respective arrows in Fig. 4, the rotation of the mandrel being effective to carry the tubular body rapidly beneath and lengthwise the cutting knife. At the same time, the tubular body is fed progressively lengthwise the mandrel toward and transversely the knife, so that the latter acts to sever from the end of the tubular body a continuous, helical thread or strip of a thickness depending upon the thickness of the tubular body and of a width depending upon the rate of longitudinal feed.

While both the mandrel and knife are preferably rotated at relatively high speeds, they are preferably driven at somewhat dissimilar rates of speed, the best results having been obtained when the cutter is so rotated that the peripheral speed is somewhat less than the peripheral speed of the cutting edge of the mandrel with which it engages. The shearing edge of the mandrel being of substantially the same diameter as the shearing edge of the cutter, the driving gear 47 for the cutter shaft is accordingly of somewhat greater diameter than the intermeshing gear 49 on the mandrel shaft.

Herein the progressive feed of the tubular body is effected by means which so acts as to cause the rubber stock automatically to draw itself toward the cutter. For this purpose there is provided a roller 55 over which the leading end of the tube is held in stretched or distended condition, so that the tube runs over the mandrel and the roller in much the same manner as a band or belt over a pair of pulleys.

The roller 55 is carried by a shaft 57 and, with the shaft, is freely rotatable in bearings 59 carried by the arm 61, the latter pivotally mounted at 63 on the head block 31. As will be seen in Fig. 1, the arm 61 is inclined to the horizontal so that the roller 55 projects at an upward angle with relation to the mandrel 15, as is best seen in Fig. 5. The result is that the portion of the band-like end of the tube passing in frictional contact over the inclined roller bears a slightly twisted relation to the cylindrical periphery of the roller. When the mandrel is driven in the direction shown by the arrows in Fig. 4, and the lower run of the belt-like tube portion meets the surface of the roller, each contacting point thereof tends to travel over the roller in adherence to the same circumferential element thereof with which it first engages. Thus in Fig. 5, if the initial contact of a given point of the belt-like tube with the roller is at $a$, this point tends to travel by adherence along the circumferential element $a\ b$ of the roller and leave the latter at a point somewhat advanced toward the journaled end of the roller. Accordingly, as the mandrel is driven, the stretched tube tends to creep along the roller causing it to be progressively fed on the mandrel toward the cutting end of the latter.

The upwardly flared end of the mandrel, where it terminates in the upwardly beveled sleeve 17, presents a tube-engaging surface of gradually increasing diameter toward the end of the mandrel and also contributes to the accurate and regular feed of the extreme leading end of the tube where it approaches the cutter.

Means are also provided whereby the roller may be adjustably swung toward or away from the mandrel and its angle thereto, as viewed in plan (Figs. 3 and 4), varied, this serving to vary the tension on the stretched end of the tube. This also acts to vary the rate of feed both by varying the tension and by varying the twisted relation of the tube to the cylindrical periphery of the roller as the latter is adjusted toward or away from the mandrel.

For this purpose the opposite end of the roller supporting arm 61 is pivotally attached to the rod 65 which is slidable longitudinally in the head block, the opposite end of the rod being threaded and engaged by the nut 67 which bears against an apertured lug 68 on the head block. The nut has secured thereto a hand crank 69 so that the operative, at the front of the machine, by turning the nut in one direction or the other is enabled to advance or retract the rod and vary the angular adjustment of the roller 55 and thereby both the stretch of the tube and the rate at which the tubular body advances lengthwise the mandrel and the roller. If the roller is swung toward the mandrel (as shown in Figs. 3 and 4), the rate of feed is lessened, and if swung away from the mandrel the rate of feed is increased.

To adapt the machine to tubular bodies of substantial length, means are provided for supporting that part of the stock which is disengaged from the mandrel while permitting it to turn freely with the leading end of the tube which is stretched over the mandrel and the roller. For this purpose an elongated, horizontal roller 71 is provided, aligned with the mandrel and preferably of lesser diameter than the inside diameter of the tube so that the latter may be readily passed over the roller. If the portion of the tube required to be supported by the roller is of greater length than the latter, it may be crowded or forced thereon loosely, as represented in Figs. 1 and 4. The roller 71 is mounted on ball or other bearings (not herein shown) carried by the stationary rod 73 which is supported in overhanging relation by the bracket 75 fixedly secured at the end of the horizontal supporting arm 77 projecting from the standard 11 beneath the mandrel. The supporting roller 71 is axially aligned with the mandrel but terminates just short of the latter so as to leave a narrow space or gap through which the tube can be slipped over the roller support.

In the operation of the machine, the tube is slipped over the roller support 71 through the narrow space or gap referred to, and, if necessary, is crowded on the support, as represented in Fig. 1. The leading end of the tube which faces the mandrel 15 is then distended or stretched to embrace the mandrel and the roller, and the friction clutch is thrown to start the mandrel and cutting knife into rapid rotation, in the direction shown by the arrows in Fig. 4. As the mandrel is rotated, the distended end of the tube is caused to travel over the mandrel and over the roller 55 which results in feeding the leading end of the tube progressively toward and under the knife. As the stretched leading end of the tube is thus rotated, the disengaged portion of the tube carried by the roller support turns freely with the movement of the mandrel. As soon as the leading end of the tube passes beneath the cutting knife 23, the latter begins to shear a narrow strip or thread therefrom in continuous, helical form, and this cutting action continues until substantially the entire length of tube has been fed onto and across the mandrel.

As the thread is delivered from the cutting knife it is wound up on the winding reel 79 (Figs. 1 and 2) by any suitable winding mechanism, such as that illustrated in Figs. 1 and 2. Referring to the winding mechanism, the winding reel 79 is removably held by spring clips 80 on a freely rotatable spindle 81 journaled in one end of the arm 83, the opposite end of which is pivoted at 85 on rearwardly projecting arms 87 secured to the upright frame member 88 of the machine. The winding reel thus rests by gravity on the periphery of a friction roller 89 carried by the horizontal shaft 91. As the mandrel 15 is rotated, the shaft 91 is also rotated by a belt and pulley connection 93 to the mandrel drive shaft 25 so that rotation is imparted to the winding reel in predetermined time relation to the severing of the thread. To feed the thread evenly on the winding reel, the former is engaged by a forked end of the upright distributing arm 95. The latter is secured to a horizontal reciprocating slide rod 97, which carries rollers 99 engaged by opposite edges of the cam 101, which latter is rotated by the worm gear 103 through the worm 105 on the friction roller shaft 91.

Accordingly, as the mandrel and cutter are rotated and the thread severed, the winding reel, by its engagement with the friction roller 89, is driven at a suitable speed to take up the thread as fast as it is delivered by the cutter, and the distributing arm 95 is reciprocated back and forth across the winding reel and functions to lay the thread evenly thereon.

Through the use of the machine herein described unusually high cutting speeds with a correspondingly high output of severed thread may be maintained, while at the same time threads may be cut of relatively narrow width and with an unusual degree of exactness, smoothness and precision. Such high cutting speeds may be maintained, furthermore, without any substantial heating or dulling of the cutting knife.

In referring to a body of tubular form, we include any band or belt-like body of rubber or other elastic material or any like body in connection with which an apparatus of the type herein claimed is capable of functioning for the purpose set forth.

While we have herein shown and described for the purpose of illustration one specific embodiment of the invention, it is to be understood that extensive deviations may be made therefrom and from the form and relative arrangement of parts, all without departing from the spirit thereof.

We claim:

1. In a machine for cutting a continuous thread or strip from a tubular body of rubber or like elastic material, the combination of a mandrel adapted to have frictional engagement with the inner walls of said body at the leading end thereof which is to be cut, said mandrel carrying a shearing edge adapted to underlie said body, a rotary cutting knife having a shearing edge in contact with the shearing edge of the mandrel, resilient means for enforcing frictional engagement between the knife and the shearing edge of the mandrel, means for rotating the mandrel to carry the tubular body beneath the cutting knife, means for rotating the knife, a freely rotatably support on which the opposite end of the body is adapted to be carried and to turn when the mandrel is rotated and means for feeding the tubular body progressively lengthwise on said mandrel toward the knife, the same comprising a roller with which the inner walls of the leading end of said tubular member have frictional engagement, said roller being positioned at an angle with relation to the mandrel to provide a tube-advancing relation to said tubular body, and means for adjusting said roller with relation to said mandrel.

2. In a machine for cutting a continuous thread or strip from a tubular body of rubber or like elastic material, the combination of a mandrel adapted to have frictional engagement with the inner walls of said body at the leading end thereof which is to be cut, said mandrel carrying a shearing edge adapted to underlie said body, a rotary cutting knife having a shearing edge in contact with the shearing edge of the mandrel, means for rotating the mandrel to carry the tubular body beneath the cutting knife, and means for feeding the tubular body progressively lengthwise the mandrel toward the knife, the same comprising a roller with which the inner walls of the leading end of the tubular body have frictional engagement, said roller being positioned at an angle with relation to the mandrel to provide a tube-advancing relation to said tubular body.

3. In a machine for cutting a continuous thread or strip from a tubular body of rubber or like elastic material, the combination of a mandrel adapted to have frictional engagement with the inner walls of said body at the leading end thereof which is to be cut, said mandrel carrying a shearing edge adapted to underlie said body, a rotary cutting knife having a shearing edge in contact with the shearing edge of the mandrel, means for rotating the mandrel to carry the tubular body beneath the cutting knife, means for feeding the tubular body progressively lengthwise the mandrel toward the knife, the same comprising a roller with which the inner walls of the leading end of the tubular body have frictional engagement, said roller being positioned at an angle with relation to the mandrel to provide a tube-advancing relation to said tubular body, and means for adjusting said roller with relation to the mandrel.

4. In a machine for cutting a continuous thread or strip from a tubular body of rubber or like elastic material, the combination with a cutter, of a pair of rotary members over which said tubular body is adapted to travel in distended belt-like relation, the same comprising a cylindrical guide roller and a mandrel, and means for rotating the latter to cause said body to travel past the cutter, said roller being inclined at an angle with relation to said mandrel to present a tube-advancing relation to said body to cause the same to draw itself progressively toward the cutter, thereby to cut a continuous, helical thread or strip therefrom.

5. In a machine for cutting a continuous thread or strip from a tubular body of rubber or like elastic material, the combination with a cutter, of a plurality of rotary members on which said tubular body is adapted to travel in distended belt-like relation past the cutter, one of said members having a tube-advancing relation to said body to cause the latter to draw itself progressively toward the cutter, thereby to cut a continuous, helical thread or strip therefrom.

6. In a machine for cutting a continuous thread or strip from a tubular body of rubber or like elastic material, the combination with a cutter, of a pair of rotary members encircled by said tubular body and over which the latter is adapted to travel in distended belt-like relation, one of said members having a tube-advancing relation to said body to cause the latter to draw itself progressively toward the cutter and the other of said members comprising a mandrel having a gradually increasing diameter toward the leading end of the tube to be cut and presenting a cutting edge in shearing relation to said cutter.

7. In a machine for cutting a continuous thread or strip from a tubular body of rubber or like elastic material, the combination with a cutter, of a pair of rotary members on which said tubular body is adapted to travel in distended belt-like relation, one of said members having a gradually increasing diameter toward the leading end of the tube to be cut.

8. In a machine for cutting a continuous thread or strip from a tubular body of rubber or like elastic material, the combination with a cutter, of a mandrel adapted to have frictional engagement with the inner walls of said body, means for rotating the mandrel to carry the body beneath the cutter, and means for feeding the body progressively and transversely toward the cutter, the same comprising a guide roller over which said body also travels in distended relation.

9. In a machine for cutting a continuous thread or strip from a tubular body of rubber or like elastic material, the combination with a mandrel over which the tubular body passes, said mandrel presenting a shearing edge underlying said tubular body, of a rotary cutting knife having a shearing edge in contact with the shearing edge of the mandrel, resilient means for forcing said shearing edges together, and means for feeding the tube with relation to the cutting knife to cause the latter to cut a continuous, helical strip therefrom.

10. In a machine for cutting a continuous thread or strip from a tubular body of rubber or like elastic material, the combination with a rotary shearing cutter having a shearing edge, of a mandrel adapted to have frictional engagement with the inner walls of the tube and presenting a shearing edge in contact with the shearing edge of the cutter, means to rotate the mandrel to carry the tube in stretched or distended condition beneath the cutter, and means for feeding the tube lengthwise on the mandrel toward the cutter.

11. In a machine for cutting a continuous thread or strip from a tubular body of rubber or like elastic material, the combination with a rotary cutter having a shearing edge, of a rotary member over which said tubular body is adapted to travel in cutting relation to the cutter, said member presenting a shearing edge underlying said body and in contact with the shearing edge of said rotary cutter, and means for rotating said member and cutter at dissimilar peripheral speeds.

12. In a machine for cutting a continuous thread or strip from a tubular body of rubber or like elastic material, the combination with a cutter, of a support engaging the tube internally over which the tubular body is adapted to travel in distended belt-like relation past the cutter, and means also engaging the tube internally and having a tube-advancing relation to said support to cause the tube to feed itself toward the cutter.

13. In a machine for cutting a continuous thread or strip from a tubular body of rubber or like elastic material, the combination with a cutter, of a support engaging the tube internally over which the tubular body is adapted to travel in distended belt-like relation past the cutter, means also engaging the tube internally and having a tube-advancing relation to said support to cause the tube to feed itself toward the cutter, and means for adjustably varying the rate of feed.

14. In a machine for cutting a continuous thread or strip from a tubular body of rubber or like elastic material, the combination with a cutter, of a mandrel over which the tube travels, said mandrel being in operative relation to the cutter, means for rotating the mandrel to carry the tubular body beneath the cutter, and a tube distending member engaging the tube internally and having a tube-advancing relation to the mandrel to cause the tube to advance longitudinally on the mandrel beneath the cutter.

In testimony whereof, we have signed our names to this specification.

FRED WILLIAM BOMMER.
CHARLES E. CLARKE.